3,071,558
FURANE RESIN LACQUERS AND PROCESS FOR PREPARING SAME
Fritz Jaffé, Koln-Braunsfeld, and Herbert Kaesmacher, Hehlrath-Aachen, Germany, assignors to Spies, Hecker and Company, Koln-Raderthal, Germany, a corporation of Germany
No Drawing. Filed July 18, 1958, Ser. No. 749,317
Claims priority, application Germany July 20, 1957
15 Claims. (Cl. 260—33.4)

This invention relates to furane resin lacquers.

At the present time, the plastics industry is manufacturing the following types of furane resins:

(a) Condensation products of furfural and phenol, (b) Polymeric ether compounds which are formed by condensation of furfuryl alcohol with other compounds which contain hydroxyl groups, for example the condensation of furfuryl alcohol with dimethylol urea in alkali medium according to U.S.A. patent specification No. 2,510,496, (c) Condensation and polymerization products of furfuryl alcohol.

The types referred to under (c) in particular have hitherto found only few applications on account of their brittleness, their very poor flowing ability and their inadequate bonding strength.

Many attempts have already been made to obviate or reduce these disadvantages, without it having so far been possible to produce a lacquer which conforms to the usual requirements. Thus, the addition of polyvinyl chloride or polyvinyl acetate has already been proposed for the production of lacquers which show better properties when processed commercially. It is true that in this way the brittleness of the lacquer layer could be somewhat reduced and the bonding strength could be increased, but the resistance to chemicals was very strongly reduced, so that the furane resins, and especially the products referred to under (c), no longer justify their claim to be the best material for protection against corrosion in a lacquer with this formulation.

It has now been found that, simply by the addition of one or more chain-like polymers which contain free OH groups in the chain to furane resin lacquers, the latter are quite substantially improved, especially as regards their flowing properties and their bonding strength to a support, without the good resistance to chemicals of the furane resin lacquers being greatly impaired. In detail, the additives which are concerned are as follows:

(1) Copolymers of vinyl chloride and vinyl acetate which have been modified by the introduction of free OH groups into the chain. The product marketed under the trade name "Vinylite VAGH" is an example of a commercial product of this type.

(2) Epoxy resins, such as those known for example under the trade names of "Epikote 1004" and "Epikote 1009," and also products having an epoxy nature, for example those with the trade name of "Dow Resin 565."

(3) Alkyd resins; examples are the products having the trade names of "Neolyn 23," "Aroplaz 1351" and "Aroplaz 930."

(4) Polyvinyl ethers which contain OH groups in the chain, such as for example the product known under the trade name of "Lutonal A 25."

The trade names set out above and elsewhere in the specification are further identified as follows:

"Vinylite VAGH" is a copolymer of about 90% of vinyl chloride and 10% of vinyl acetate in which a part of the acetate groups has been saponified. The "Vinylite" resins are obtainable from Carbide and Carbon Chemicals, Inc., New York.

"Epikote 1004" and "Epikote 1009" are epichlorohydrine bisphenyl resins. 1004 has a melting point of 95 to 105° C. and an epoxy equivalent weight of 870 to 1025. 1009 has a melting point of 145 to 155° C. and an epoxy equivalent weight of 2400 to 4000 and are obtainable from the Shell Oil Company, of New York.

"Dow Resin 565" is a reaction product of epichlorohydrine and diphenylol-propane in which the epoxy group has been converted to a hydroxyl group. The "Dow" resin is manufactured by the Dow Chemical Company, of Midland, Michigan.

"Neolyn 23" is an aliphatic alkyd resin having a high OH number and is manufactured by the Hercules Powder Company, of Wilmington, Delaware.

"Aroplaz 1351" and "Aroplaz 930" are oil-modified alkyd resins having free OH groups and specifically castor oil modified alkyd resins, and are obtainable from U.S. Industrial Chemicals Company, of New York.

"Lutonal A 25" is a polyvinylether having free OH groups, and is obtainable from Badische Anilin Soda Fabrik, Rhein, West Germany.

In principle, however, all chain-like polymers with free OH groups in the chain are suitable for improving the technology properties of the lacquers.

From the lacquer technology point of view, these additives can have quite different effects. Thus, a furane resin with an addition of up to 5% by weight of VAGH copolymer attains particularly good cupping values, i.e. is highly crack-resistant when flexed; the resistance to agents having a strongly corrosive action was only slightly reduced. Combining with epoxy resins or alkyd resins substantially improves the flowing capacity of the lacquer.

It will be seen from this that the composition of the lacquer modified in accordance with the invention depends entirely on the stresses to which the coating system is subjected. For example, a furane resin lacquer having high resistance to chemicals should contain a small proportion, namely about 1–2% by weight, of "Vinylite VAGH"; with such a combination, average cupping values and good resistance to chemicals are still obtained.

In contrast to the prior proposals, it is possible in accordance with the present invention by skillful formulation and above all with very small proportions of additives to obtain good results from a lacquer technology point of view, the resistance to chemicals of the lacquer film not being changed or only being changed to an insignificant degree as compared with the pure furane resin structure. For the lacquers in accordance with the invention, it is possible with particular advantage to use those furane resins which are obtained by condensation of furfuryl alcohol in the presence of acid catalysts at condensation temperatures between 40 and 60° C., but at a maximum of 65° C., and with pH values of the aqueous phase from 2.0 to 2.5. Such a furane resin can for example be produced as follows.

1,500 g. of water are added to 2,500 g. of furfuryl alcohol, the mixture is vigorously stirred and thereafter 1 litre of aqueous sulphuric acid (0.75 g. $H_2SO_4$/l.) is added. The pH value of this mixture is 2.42. The mixture is then carefully heated to a temperature of 60° C. while stirring vigorously. When this temperature is reached, the heating is stopped and the heat of reaction liberated is sufficient for the condensation or polymerization to continue without any substantial rise in temperature, at least not above 65° C. After approximately 5–6 hours, the temperature starts to drop and then heat can be supplied for 3 hours, it being possible for the temperature to fluctuate between 60 and 80° C. without any appreciable influence on the final product.

The resin obtained has a viscosity of 140 to 180 DIN-seconds and is particularly resistant to chemicals because of its molecule size and on account of the small content of short-chain intermediate products. The viscosity of the resin also does not increase appreciably after 3 months.

The process for the production of such furane resins is not the subject of this application, but of the prior patent application No. 725,639.

The present invention will not be further illustrated by reference to a number of examples, in which the percentages are by weight.

Example 1 (*Usual Lacquer Mixture*)

20 g. of hardener solution, containing 25% phosphoric acid and 75% methyl ethyl ketone, are added to 100 g. of furane resin (consistency 160 DIN-seconds). The lacquer coatings obtained by dipping smooth sheet iron to give a coating with a thickness of 0.8 mm. is hardened in an oven at 100° C. With a film thickness from 75 to 100μ, the Erichsen value is approximately 1 mm. and the pendulum hardness approximately 190″. The flow properties are poor and there is strong crater formation on spraying.

Example 2

100 g. of furane resin as described in Example 1 are mixed with 35 g. of a solution containing 15% of a copolymer of vinyl chloride and vinyl acetate (with 91% vinyl chloride component), this copolymer containing OH groups, and with 40% of methyl ethyl ketone and 45% of methyl isobutyl ketone. 20 g. of hardener solution as described in Example 1 are added to this mixture while stirring. Lacquer coatings hardened on smooth sheet iron at 100° C. produce a cupping value of 5–7 mm. and a pendulum hardness of 180″ with a layer thickness of about 100μ. Good flow properties are observed.

Example 3 (*With Priming*)

A smooth sheet of iron with a priming coat of 20μ thickness consisting of a copolymer of vinyl chloride and vinyl acetate which is modified by introduction of free OH groups into the chain is dipped twice into the furane resin lacquer described in Example 2. The sheet, after hardening at 100° C., is covered with a hardened lacquer film of 110μ thickness. The pendulum value found is 180–185″ and the Erichsen value 7–10 mm. Very good flow properties and particularly good bonding are observed.

Example 4

A metal sheet is primed as described in Example 3 and the 20μ thick priming coat has applied thereto a furane resin lacquer which, instead of the additive used in Example 3, contains the same quantity of the epoxy resin "Epikote 1009." After hardening, the same pendulum value as in Example 3 and cupping values between 5 and 7 mm. are measured. Very good flow properties and good bonding are observed.

Example 5

A metal sheet primed as described in Example 3 is coated with a furane resin lacquer containing 2% of the epoxy resin "Epikote 1004" and 2% of a VAGH copolymer, calculated on pure furane resin, this being hardened at 100° C. The pendulum value of the lacquer film is in the region of 180″, and the Erichsen value is between 4 and 6 mm. Good flow properties and good bonding are observed.

With the furane resin lacquers described above, produced by mixing a previously prepared solution of the chain-like polymer containing free OH groups in the chain at room temperature with the furane resin lacquer, it is in general possible to produce improvements in the technological lacquer properties only by the addition of proportions of up to about 10% of chain-like polymers containing OH groups. It is certainly possible to incorporate larger proportions of the chain-like polymers in the furane resin, but an increase in the effect beyond the indicated limit is in practice no longer produced.

According to one embodiment of the process of the invention, substantially greater improvements in the technological lacquer properties can be produced and also the addition of larger proportions of the chain-like polymers yields an even better improvement if the previously prepared solutions of the chain-like additional polymers containing OH groups are not simply mixed with the furane resin lacquer at room temperature, but are boiled with this lacquer.

In this case, the chain-like polymers containing free OH groups in the chain can be used in solution in conventional lacquer solvents, for example ketones, alcohols, esters or, particularly advantageously dissolved in furfurol.

The boiling is so carried out that, depending on the nature of the additional polymer to be boiled with the furane resin, final temperatures of about 100 to 140° C. are reached with a boiling time of about 1 hour. When normal lacquer solvents are used, these are preferably removed by being boiled off at the beginning of the boiling operation. If furfurol is used as the solvent, the boiling preferably takes place under reflux, so that all the furfurol is present throughout the boiling period. When the boiling operation is complete, such an amount of furfurol is then driven off under vacuum that about 10% of the furfurol, calculated on the furane resin employed, remain in the boiled lacquer. This 10% of furfurol serves as a monomer capable of being incorporated during the hardening of the lacquer.

Example 6

200 g. of furfuryl alcohol resin, produced as described in patent application No. 725,639 are mixed with 100 g. of a 20% polyvinyl butyral solution (Mowital B 30 H, obtainable from Farbwerke Hoechst). Spirit and butanol are used in the ratio of 1:1 as solvent for the butyral solution.

The mixture is heated, so that both solvents can evaporate. Thereafter, 20 g. of furfurol are added and the mixture is boiled for another 1½ hours at 140° C. under reflux. Thereafter the product is dissolved in 400 g. of a solvent mixture consisting of 200 g. of ethyl acetate, 100 g. of butanol and 100 g. of spirit.

In order to produce a lacquer film, 100 g. of the dissolved product had added thereto 5 g. of a 3% hardener solution (consisting of 97% ethyl acetate and 3% $H_2SO_4$). An iron plate lacquered with this lacquer (1 hour at 120° C.) showed the following values:

Erichsen cupping_____mm__ 85 to 9.0
Pendulum hardness according to
  W. Konig_____sec__ 200 to 205

After an ageing time of 12 hours at 100° C., the Erichsen values are between 8.0 and 8.4 mm.

Example 7

100 g. of a 20% solution of vinyl resin VAGH in furfurol are added to 80 g. of furfuryl alcohol resin, produced as described in patent application No. 725,639 and the solution boiled for 1 hour under reflux at 105° C. while stirring. Thereafter, 70 g. of furfurol are distilled off again in vacuo (at a pressure of 20 mm. and a temperature of 64° C.). The resin mixture is then dissolved in 50 g. of a solvent consisting of 25 g. of ethyl acetate, 12.5 g. of methyl isobutyl ketone and 12.5 of methyl ethyl ketone. An iron plate lacquered with this lacquer has the following values after hardening for 1 hour at 120° C.:

Erichsen cupping _____mm__ 8.0 to 8.5
Pendulum hardness according to
  W. Konig_____sec__ 195 to 200

After artificial ageing (12 hours at 100° C.), the Erichsen value is between 7.5 and 8.0 mm.

It is assumed that the possibility of incorporating larger proportions of additional polymer, with the accompanying improvement in the technological lacquer properties of the furane resin lacquers which can be obtained, are due to the fact that an etherification of the free OH groups of both components occurs during the boiling.

What we claim is:

1. Furfuryl alcohol resin lacquer, comprising a boiled admixture of a finally condensed furfuryl alcohol liquid resin with a member selected from the group consisting of copolymers of vinylchloride and vinylacetate which have been modified by the introduction of free OH groups into the chain, epoxy resins, alkyd resins, polyvinyl ethers containing OH groups in the chain, and polyvinyl butyral.

2. Furfuryl alcohol resin lacquer according to claim 1, in which said member is a copolymer of vinylchloride and vinyl-acetate which has been modified by the introduction of free OH groups into the chain.

3. Furfuryl alcohol resin lacquer according to claim 1, in which said member is an epoxy resin containing OH groups.

4. Furfuryl alcohol resin lacquer according to claim 1, in which said member is an alkyd resin containing OH groups.

5. Furfuryl alcohol resin lacquer according to claim 1, in which said member is a polyvinyl ether containing OH groups.

6. Furfuryl alcohol resin lacquer, comprising a boiled admixture of a finally condensed furfuryl alcohol liquid resin with polyvinylbutyral.

7. Furfuryl alcohol resin lacquer, comprising a boiled admixture of a finally condensed furfuryl alcohol liquid resin with a solution of polyvinylbutyral in spirit and butanol.

8. Furfuryl alcohol resin lacquer, comprising a boiled admixture of a finally condensed furfuryl alcohol liquid resin with a solution with a copolymer of vinylchloride and vinylacetate, in which part of the acetate groups have been saponified.

9. A process for the production of furfuryl alcohol resin lacquers, which comprises admixing a finally condensed furfuryl alcohol liquid resin with a solution of a member selected from the group consisting of copolymers of vinylchloride and vinylacetate which have been modified by the introduction of free OH groups into the chain, epoxy resins, alkyd resins, polyvinyl ethers containing OH groups in the chain, and polyvinyl butyral, boiling the mixture, recovering the reaction product thereby formed, and thereafter forming said lacquer by dissolving said reaction product in a solvent therefor.

10. Process according to claim 9, in which up to about 10% by weight of said group member is admixed with said finally condensed furfuryl alcohol liquid resin.

11. A process for the production of furfuryl alcohol resin lacquers, which comprises admixing a finally condensed furfuryl alcohol liquid resin with a member selected from the group consisting of copolymers of vinylchloride and vinylacetate which have been modified by the introduction of free OH groups into the chain, epoxy resins, alkyd resins, polyvinyl ethers containing OH groups in the chain, and polyvinyl butyral, and at least one solvent for the reaction product, boiling the mixture, and recovering said reaction product in the form of its solution.

12. A process for the production of furfuryl alcohol resin lacquers, which comprises admixing a finally condensed furfuryl alcohol liquid resin with a member selected from the group consisting of copolymers of vinylchloride and vinylacetate which have been modified by the introduction of free OH groups into the chain, epoxy resins, alkyd resins, polyvinyl ethers containing OH groups in the chain, and polyvinyl butyral, boiling the mixture under reflux, at the end of the boiling driving off at least the major proportion of the solvent by evaporation in vacuo, and recovering the reaction product in the form of its solution.

13. A process for the production of furfuryl alcohol resin lacquers, which comprises admixing a finally condensed furfuryl alcohol liquid resin with a solution of a member selected from the group consisting of copolymers of vinylchloride and vinylacetate which have been modified by the introduction of free OH groups into the chain, epoxy resins, alkyd resins, polyvinyl ethers containing OH groups in the chain, and polyvinyl butyral, and furfurol, boiling the mixture under reflux, at the end of the boiling, driving off at least the major proportion of the furfurol by evaporation in vacuo, and recovering said reaction product in the form of its solution.

14. A process for the production of furfuryl alcohol resin lacquers, which comprises admixing a finally condensed furfuryl alcohol liquid resin with a solution of a modified polyvinylbutyral polymer having free OH groups in its side-chains and with at least one solvent for the reaction product, boiling the mixture and recovering said reaction product in the form of its solution.

15. Process according to claim 14, in which said solvent is a mixture of spirit and butanol in the ratio of 1:1.

References Cited in the file of this patent

UNITED STATES PATENTS

| | | |
|---|---|---|
| 2,335,701 | Root | Nov. 30, 1943 |
| 2,383,790 | Harvey | Aug. 28, 1945 |
| 2,399,055 | Nordlander | Apr. 23, 1946 |
| 2,432,623 | Kauth | Dec. 16, 1947 |